US008554555B2

(12) United States Patent
Gruhn et al.

(10) Patent No.: US 8,554,555 B2
(45) Date of Patent: Oct. 8, 2013

(54) METHOD FOR AUTOMATED TRAINING OF A PLURALITY OF ARTIFICIAL NEURAL NETWORKS

(75) Inventors: Rainer Gruhn, Ulm (DE); Daniel Vasquez, Ulm (DE); Guillermo Aradilla, Ulm (DE)

(73) Assignee: Nuance Communications, Inc., Burlington, MA (US)

( * ) Notice: Subject to any disclaimer, the term of this patent is extended or adjusted under 35 U.S.C. 154(b) by 905 days.

(21) Appl. No.: 12/707,283

(22) Filed: Feb. 17, 2010

(65) Prior Publication Data
US 2010/0217589 A1 Aug. 26, 2010

(30) Foreign Application Priority Data

Feb. 20, 2009 (EP) .................................. 09002464

(51) Int. Cl.
*G10L 15/00* (2013.01)
*G10L 15/16* (2006.01)

(52) U.S. Cl.
USPC .......................................................... 704/232

(58) Field of Classification Search
USPC .......................................................... 704/232
See application file for complete search history.

(56) References Cited

U.S. PATENT DOCUMENTS

| | | | | |
|---|---|---|---|---|
| 5,317,673 A * | 5/1994 | Cohen et al. | ................... | 704/232 |
| 5,509,103 A * | 4/1996 | Wang | ........................... | 704/232 |
| 5,621,848 A * | 4/1997 | Wang | ........................... | 704/211 |
| 5,749,066 A * | 5/1998 | Nussbaum | .................... | 704/232 |
| 5,930,754 A * | 7/1999 | Karaali et al. | ................ | 704/259 |
| 6,026,358 A * | 2/2000 | Tomabechi | .................... | 704/232 |
| 6,947,890 B1 * | 9/2005 | Kitazoe et al. | ................ | 704/232 |
| 7,444,282 B2 * | 10/2008 | Choo et al. | ..................... | 704/202 |
| 2004/0172238 A1 * | 9/2004 | Choo et al. | ..................... | 704/202 |
| 2004/0199389 A1 * | 10/2004 | Geiger | ........................... | 704/254 |

FOREIGN PATENT DOCUMENTS

| | | |
|---|---|---|
| EP | 1 453 037 A2 | 9/2004 |
| WO | WO 95/34035 | 12/1995 |

OTHER PUBLICATIONS

Pinto, J., et al., "Exploiting Contextual Information for Improved Phoneme Recognition," *IEEE*, Mar. 31, 2008, pp. 4449-4452.
Schwarz, P., et al., "Towards Lower Error Rates in Phoneme Recognition," Speech and Dialogue, No. 7, Sep. 8, 2004, pp. 465-472.
European Patent Office, Extended European Search Report; Application No. 09002464.7-2225; May 12, 2009.

\* cited by examiner

*Primary Examiner* — Talivaldis Ivars Smits
*Assistant Examiner* — Shaun Roberts
(74) *Attorney, Agent, or Firm* — Sunstein Kann Murphy & Timbers LLP

(57) ABSTRACT

The invention provides a method for automated training of a plurality of artificial neural networks for phoneme recognition using training data, wherein the training data comprises speech signals subdivided into frames, each frame associated with a phoneme label, wherein the phoneme label indicates a phoneme associated with the frame. A sequence of frames from the training data are provided, wherein the number of frames in the sequence of frames is at least equal to the number of artificial neural networks. Each of the artificial neural networks is assigned a different subsequence of the provided sequence, wherein each subsequence comprises a predetermined number of frames. A common phoneme label for the sequence of frames is determined based on the phoneme labels of one or more frames of one or more subsequences of the provided sequence. Each artificial neural network using the common phoneme label.

26 Claims, 4 Drawing Sheets

US 8,554,555 B2

METHOD FOR AUTOMATED TRAINING OF A PLURALITY OF ARTIFICIAL NEURAL NETWORKS

PRIORITY

The present patent applications claims priority from European Patent Application 09002464.7 filed on Feb. 20, 2009, entitled Method for Automated Training of a Plurality of Artificial Neural Networks.

TECHNICAL FIELD

The present invention relates to a method for automated training of a plurality of artificial neural networks for phoneme recognition.

BACKGROUND ART

Phoneme recognition is utilized in the fields of automatic speech recognition (see e.g. R. Gruhn et al., "A statistical lexicon for non-native speech recognition", in Proc. of Interspeech, 2004, pp. 1497-1500), speaker recognition (E. F. M. F. Badran and H. Selim, "Speaker recognition using artificial neural networks based on vowelphonemes", in Proc. WCCC-ICSP, 2000, vol. 2, pp. 796-802) or language identification (M. A. Zissman, "Language identification using phoneme recognition and phonotactic language modelling", in Proc. ICASSP, 1995, vol. 5, pp. 3503-3506).

A common approach for phoneme recognition is based on a combination of artificial neural networks (ANN) and Hidden Markov Models (HMM) (e.g. H. Bourlard and N. Morgan, "Connectionist Speech Recognition: A Hybrid Approach", Kluwer Academic Publishers, 1994). The artificial neural networks can be trained to discriminatively classify phonemes.

Context information plays an important role for improving performance of phoneme recognition, as the characteristics of a phoneme can be spread on a long temporal context (e.g. H. H. Yang et al., "Relevancy of time-frequency features for phonetic classification measured by mutual information", in Proc. ICASSP, 1999, pp. 225-228).

A conventional way to increase the context is performed by concatenating short term features. However, the amount of temporal information given to an artificial neural network is limited by the quantity of training data. In particular, when the context is extended, an increased amount of information is given to the artificial neural network, which requires more training data for robustly determining its parameters.

One method to overcome this problem comprises splitting the context in time and dividing the classification task with several artificial neural networks followed by a combination of all of them. In J. Pinto et al., "Exploiting contextual information for improved phoneme recognition", in Proc. ICASSP, 2008, pp. 4449-4452, for example, a phoneme is equally divided into three slides modelling states. A separate artificial neural network is trained employing the label given in the central frame of the corresponding slide. However, the performance of this approach is not significantly increased compared to a single artificial neural network, which is trained to discriminatively classify the states of all phonemes.

SUMMARY OF THE INVENTION

According to the present invention, a method for automated training of a plurality of artificial neural networks for phoneme recognition using training data, wherein the training data comprises speech signals subdivided into frames, each frame associated with a phoneme label, wherein the phoneme label indicates a phoneme associated with the frame. A sequence of frames from the training data is provided, wherein the number of frames in the sequence of frames is at least equal to the number of artificial neural networks. A different subsequence of the provided sequence is assigned to each of the artificial neural networks, wherein each subsequence comprises a predetermined number of frames. A common phoneme label is determined for the sequence of frames based on the phoneme labels of one or more frames of one or more subsequences of the provided sequence. Each artificial neural network is then trained using the common phoneme label.

In this way, different artificial neural networks or classifiers can be trained, belonging to different subsequences, parts or slides of a sequence of frames from the training data. In other words, each artificial neural network can be trained based on a reduced part of the temporal context or global context. This can imply a decrease in the required amount of training data compared to that required when using a single artificial neural network or classifier for phoneme recognition with the whole temporal context.

Using a common phoneme label for training the artificial neural networks can yield more coherent artificial neural networks, in particular, more coherently determined parameters or weights of the artificial neural networks. This can be in particular relevant if the provided sequence of frames is associated with more than one phoneme. In this case, the phoneme labels of at least two of the frames may be different from each other.

The phoneme recognition accuracy of the combined, trained artificial neural networks can be increased compared to the phoneme recognition accuracy of a single artificial neural network used for phoneme recognition.

A phoneme is the minimal unit of speech sound in a language that can serve to distinguish meaning. Due to co-articulation effects, a particular instance of a phoneme may behave differently if the instance is found isolated or if it is embedded in sequence with other phonemes.

All instances of a phoneme which carry the same meaning may correspond to a phoneme class or phoneme category. In particular, all phoneme instances which carry the same meaning but, e.g. due to co-articulation effects, behave differently, may correspond to the same phoneme class or phoneme category. A phoneme or phoneme class may be associated with a phoneme label. In particular, all instances of a phoneme corresponding to a phoneme class may be associated with the same phoneme label. In other words, a phoneme label may indicate a phoneme, or a phoneme class.

A phoneme may be subdivided or split into phoneme states, wherein a phoneme state may correspond to a part or a section of a phoneme. In this way, subunits of phonemes can be considered, yielding an increased amount of information. A phoneme label may comprise an indication of the phoneme state. In other words, a phoneme label may indicate a phoneme, or a phoneme class and a phoneme state.

An artificial neural network may comprise a plurality of nodes, neurons, processing elements or units. The units may be connected among each other to form a network. Each unit may comprise an activation function. The plurality of artificial neural networks may comprise two or more artificial neural networks.

An artificial neural network, in particular each unit of the artificial neural network, may comprise parameters, in particular, variable parameters. The parameters may comprise weights, in particular stochastic weights. Each neuron or unit may comprise or be associated with at least one weight or weight function.

Automatic or automated training of an artificial neural network may comprise modifying or adjusting a weight of a unit, in particular, in an automated way. Automatic training may, in particular, comprise adjusting or modifying the weights of some or of all units of an artificial neural network.

In particular, training an artificial neural network may comprise determining an input based on frames of a subsequence assigned to the artificial neural network. The step of training an artificial neural network may comprise comparing an output of the artificial neural network with a desired or wanted output. In other words, training may be based on supervised learning.

The training step may further comprise modifying the weights of an artificial neural network such as to account for differences between the output and the desired output. The output at the output units of an artificial neural network may correspond to posterior probabilities at the phoneme or phoneme state level, i.e. the probability that the input corresponds to, is based on or associated with a predetermined phoneme, phoneme class and/or phoneme state. In particular, the output of an artificial neural network may comprise for each phoneme, phoneme class and/or phoneme state a posterior probability that the input corresponds to, is based on or associated with the phoneme, phoneme class and/or phoneme state. The output of an artificial neural network may correspond to the phoneme, phoneme class and/or phoneme state having the highest posterior probability.

The desired output may correspond to the actual phoneme, phoneme class and/or phoneme state corresponding to the input, in particular, the desired output may correspond to, be specified by or based on the common phoneme label. In this way, each artificial neural network can be trained using the common phoneme label.

The training data may comprise speech signals, in particular a plurality of utterances spoken by a plurality of speakers. In this way, a plurality of variations of a particular phoneme may be used for training.

The training data may comprise sets. In this way, different parts of the training data may be used differently. In particular, the training data may comprise a training data set, a cross-validation data set and/or a test data set. The training data may comprise phonemes or speech signals corresponding to phonemes. In particular, each phoneme or speech signal corresponding to a phoneme may be labelled. In other words, each phoneme of the training data may be associated with a phoneme label, indicative of the respective phoneme or phoneme class. The training data may be hand-labelled. A phoneme label may correspond to a symbolic representation of the respective phoneme, phoneme class and/or phoneme state.

The training data may be stored in a memory.

A speech signal of the training data may be processed using a window function, in particular with a predetermined width. The window function applied to the speech signal may yield a frame, in particular, a signal frame.

A continuous speech signal, in particular, a time dependent speech signal, of the training data may be processed using a plurality of window functions, wherein the window functions are shifted with respect to each other in time, or using one window function with a variable shift. In this way, a sequence of frames from the training data may be provided. Apart from the shift or time-shift, the window functions may be equal. The shift between each pair of window functions applied to the continuous speech signal may be equal or constant. In this way, frames equidistantly spaced in time may be obtained.

A phoneme may be associated with one or more frames. In particular, one or more frames may correspond to a phoneme or a speech signal corresponding to a phoneme. In other words, each phoneme may occupy one or more frames. In particular, each frame may be associated with a phoneme.

The phoneme or the speech signal corresponding to a phoneme may be associated with a phoneme label. Each frame may be associated with a phoneme label. In particular, the phoneme label of a frame may be based on or correspond to the phoneme label of the phoneme that is associated with the frame or that occupies the frame.

The provided sequence of frames from the training data may correspond to a signal segment or a temporal context of the training data.

In particular, a sequence of frames or a signal segment, in particular from the training data, may comprise a plurality of frames. The sequence of frames may be a consecutive sequence of frames. In other words, a sequence of frames may correspond to a set of subsequent frames, in particular, subsequent or adjacent in time. A sequence of frames or signal segment may comprise or be associated with one or more phonemes.

A sequence of frames may correspond to a context length or time period. In particular, a sequence of frames from a speech signal may correspond to a signal segment of the speech signal covering a predetermined time period or time interval.

The phoneme labels of the frames of the provided sequence may form a set of phoneme labels. The frames of the provided sequence of frames may be associated with at least one phoneme label. In other words, the set of phoneme labels may comprise at least one phoneme label. The set of phoneme labels may comprise at least one label which is different from the other labels of the set of labels. In particular, at least two frames from the provided sequence of frames may have a differing phoneme label. In other words, the phoneme labels of at least two of the frames from the provided sequence of frames may be different from each other.

A sequence of frames, in particular from the training data, may comprise a plurality of subsequences, parts or subsets. Each subsequence, part or subset may comprise a predetermined number of frames, in particular, a predetermined number of subsequent or adjacent frames.

The subsequences assigned to the artificial neural networks may differ from each other.

The number of parts or subsequences of the provided sequence of frames may be equal to the number of artificial neural networks. In this way, each artificial neural network can model a different part or context of the provided sequence of frames.

The number of frames in the provided sequence of frames may correspond to the product of the number of artificial neural networks and the number of frames per subsequence, in particular, the predetermined number of frames.

One or more frames of the provided sequence of frames may be part of one, more than one or no subsequence assigned to an artificial neural network.

If one or more frames of the provided sequence of frames are part of more than one subsequence, the subsequences, in particular the temporal context of the subsequences, may overlap, in particular partially. In other words, the intersection of the subsequences may be non-empty. If the subsequences overlap, one or more of the plurality of artificial neural networks may be used to model a transition between two neighbouring subsequences or parts. A global classifier comprising the plurality of artificial neural networks, which were trained as described herein, may yield a higher phoneme recognition accuracy when using overlapping subsequences compared to using non-overlapping subsequences.

If each frame of the provided sequence of frames is part of only one or no subsequence, the subsequences may not overlap. In other words, the intersection of the subsequences may be empty.

The concatenation or combination of the subsequences may correspond to the provided sequence of frames. In this case each frame of the provided sequence of frames may be part of one subsequence, in particular, of only one subsequence. In other words, the set union of the frames of the subsequences may correspond to the provided sequence. Furthermore, the number of frames of the provided sequence may equal the sum over the frames of all subsequences.

Alternatively, the concatenation or combination of the subsequences may correspond to a sequence of frames different from the provided sequence of frames. In this case, the provided sequence of frames may comprise frames which are part of no subsequence, in particular, of no subsequence assigned to one of the plurality of artificial neural networks. In other words, the set union of the subsequences may not correspond to the provided sequence. In particular, the sum over the frames of all subsequences may be greater than or less than the number of frames of the provided sequence.

A common phoneme label may be determined for the provided sequence of frames. The common phoneme label may correspond to a phoneme label of one of the frames of one of the subsequences. In particular, the common phoneme label may be based on one or more phoneme labels of frames from one or more central subsequences or artificial neural networks, in particular, on a central frame of a central subsequence. In this way, the artificial neural networks can be trained with a central label or central phoneme of the provided sequence. In the case of a central frame of a central subsequence, the number of subsequences or artificial neural networks and the predetermined number of frames may be odd. The other artificial neural networks may model the left and right temporal context or subsequences of a central subsequence.

Alternatively or additionally, the common phoneme label may correspond to the most frequent phoneme label of the frames from one subsequence or from all subsequences of the provided sequence, assigned to the plurality of artificial neural networks.

The predetermined number of frames may be the same for each subsequence of frames. In this way, each artificial neural network can be trained with the same context length or time period. This can improve or ensure the coherence of the artificial neural networks and the robustness of the estimated or determined parameters and/or weights.

The frames of the provided sequence of frames may be subsequent or adjacent in time and/or the subsequences may be subsequent or adjacent in time. In this way, a subsequence may be defined as an inner subsequence, if there is at least one subsequence earlier in time and at least one subsequence later in time than the subsequence defined as inner subsequence.

A central subsequence may be defined as a subsequence comprising a central frame of the provided sequence of frames, wherein, in particular, the time interval covered by a central frame comprises or is directly adjacent to the point in time bisecting or halving the time interval or temporal context covered by the provided sequence of frames. In particular, if the number of frames in the provided sequence is odd, there may be only one central frame. If the number of frames in the provided sequence is even, there may be two central frames. Hence, there may be at most two central subsequences.

In particular, in the case that the number of subsequences is odd and the predetermined number of frames is the same for each subsequence, there may be exactly one central subsequence.

A central frame of a subsequence may be defined such, that a time interval covered by a central frame of a subsequence comprises or is directly adjacent to the point in time bisecting or halving the time interval or temporal context covered by the subsequence. If the predetermined number of frames is odd, there may be exactly one central frame. If the predetermined number of frames is even, there may be two central frames.

In particular, the number of subsequences and the predetermined number of frames may be odd. In this way, exactly one central subsequence and exactly one central frame for each subsequence can be specified. In this case, the central subsequence and/or the central frame may correspond to the median of the sequence of concatenated subsequences or the sequence of frames of a subsequence, respectively.

The plurality of artificial neural networks may comprise two subsets, wherein a subsequence assigned to an artificial neural networks of a first subset may comprise at least one frame which is also part of a subsequence assigned to an artificial neural networks of a second subset. In this way, overlapping, in particular partially overlapping, subsequences may be assigned to the plurality of artificial neural networks. In particular, the plurality of artificial neural networks may comprise more than two subsets, wherein to one or more artificial neural networks of one or more subsets a subsequence may be assigned, wherein the subsequence may overlap, in particular partially, with at least one further subsequence assigned to an artificial neural network of a differing subset.

The subsequences may be separated from each other in time, in particular, separated by one or more frames comprised in the provided sequence of frames. One frame or a group of subsequent frames of the provided sequence, which separate two subsequences, may be termed a gap frame or a group of gap frames. A gap frames or a group of gap frames may have a left adjacent frame and a right adjacent frame, wherein the left adjacent frame may be part of a first subsequence, and the right adjacent frame may be part of a second subsequence, in particular, wherein the first and the second subsequence may be subsequent in time and each assigned to a different artificial neural network.

The plurality of artificial neural networks may comprise two subsets, wherein subsequences assigned to artificial neural networks of a first subset are separated from each other in time, and wherein each of the subsequences assigned to artificial neural networks of a second subset may comprise at least one frame separating two subsequences assigned to artificial neural networks of the first subset. In other words, the subsequences assigned to artificial neural networks of the second subset may comprise one or more gap frames. In this way, transitions that appear between the subsequences or the artificial neural networks of a first subset may be modelled by the artificial neural networks of the second subset.

The at least one frame separating two subsequences assigned to artificial neural networks of the first subset may correspond to the central frame of a subsequence assigned to an artificial neural network of the second subset. In other words, the central frame of a subsequence assigned to an artificial neural networks of the second subset may correspond to a gap frame. In this case, the predetermined number of frames may be odd.

The predetermined number of frames may correspond to the number of frames, which yields, when using only one artificial neural network for phoneme recognition, a predetermined phoneme recognition accuracy, in particular according to a predetermined criterion.

In particular, the predetermined phoneme recognition accuracy may correspond to the maximum phoneme recognition accuracy as a function of the number of frames. In other words, the predetermined criterion may comprise maximizing the phoneme recognition accuracy or minimizing the phoneme error rate for a single artificial neural network used for phoneme recognition, in particular, wherein the phoneme recognition accuracy or the phoneme error rate are only a function of the number of frames used for the input of the artificial neural network.

The predetermined number of frames may correspond to the average phoneme length in the training data, wherein the average is calculated using all phonemes of the training data. In this way, a maximum phoneme recognition accuracy, when using only one artificial neural network for phoneme recognition, may be achieved. In particular, for each phoneme or phoneme class an average length may be determined. The average length may be determined using all instances of a phoneme in the training data. The average phoneme length may correspond to the average of the average lengths of all phonemes or phoneme classes.

Each phoneme label of the frames of the provided sequence of frames may comprise an indication of a phoneme state, wherein the phoneme state may correspond to a part or a section of a phoneme. In other words, the artificial neural networks may be trained using phoneme states. In this case, the number of output units of each artificial neural network may correspond to the number of phoneme states for each phoneme times the number of phonemes or phoneme classes in the training data.

In particular, the step of providing a sequence of frames may be preceded by dividing each phoneme of the training data into a predetermined number of phoneme states. Different phoneme states may correspond to different parts or sections of a phoneme. In particular, each frame of the training data may be associated with a phoneme label indicating the phoneme state and the phoneme or phoneme class associated with that frame. In particular, the step of dividing each phoneme into a predetermined number of phoneme states may be followed by modifying the phoneme label of each frame such as to include an indication of the phoneme state associated with that frame.

For each frame of each subsequence of frames a feature vector may be provided, in particular, comprising a predetermined number of Mel Frequency Cepstral Coefficients (MFCC). Each feature vector may have a predetermined dimensionality. A feature vector may comprise log energy, delta and/or double delta coefficients.

All or a plurality of feature vectors of a subsequence of frames may be concatenated or combined, thereby obtaining a multi-feature vector, wherein, in particular, for each artificial neural network, a multi-feature vector may be used as an input. In particular, the multi-feature vector used as an input for an artificial neural network may be determined by concatenating feature vectors of the frames of the subsequence assigned to the artificial neural network.

One or more of the plurality of artificial neural networks may be a feedforward artificial neural network. In particular, each artificial neural network may comprise a Multilayered Perceptron or each artificial neural network may be a Multi-layered Perceptron. In particular, the plurality of artificial neural networks may correspond to a plurality of Multilayered Perceptrons.

Each artificial neural network may comprise a predetermined number of neural network layers, in particular wherein at least one neural network layer of each artificial neural network comprises a predetermined number of hidden units.

Each artificial neural network may comprise output units, wherein each output unit may comprise a softmax nonlinearity function or activation function. In this way, the output of the output units may correspond to posterior probabilities.

The step of training may comprise a back-propagation or propagation of error algorithm, in particular, with cross-entropy error criteria.

A learning rate reduction and/or stop training criteria may be controlled by a frame error rate in cross-validation. In this way, over-training may be avoided. The learning rate may correspond to a parameter controlling the strength or magnitude of the change of a weight given a difference between the output of an artificial neural network and the wanted output. The learning rate may be variable. The steps of a method for automatic training may be performed repeatedly until stop training criteria are met.

A phoneme insertion penalty may be set such as to yield a maximum phoneme recognition accuracy in the cross-validation. The phoneme insertion penalty may correspond to an ad-hoc parameter.

The step of training may be followed by validating a training result using cross-validation. In particular, validating a training result using cross-validation may be performed using the cross-validation data set of the training data.

After the step of training, in particular, after the step of cross-validation, for each artificial neural network a phoneme recognition accuracy or a phoneme error rate may be determined using the trained artificial neural networks and the test data set of the training data.

The phoneme error rate and/or the phoneme recognition accuracy may be specified as a fraction, in particular as a percentage. In the case that both quantities are specified as a percentage, the phoneme recognition accuracy may correspond to the difference between 100% and the phoneme error rate.

The output of the artificial neural networks may be combined, in particular, using a merger. In other words, the output of each of the artificial neural networks may be combined with the output of the other artificial neural networks.

The merger may correspond to an artificial neural network, in particular a Multilayered Perceptron (MLP). The input of the artificial neural network merger may comprise a concatenation of posterior feature vectors from the plurality of artificial neural networks to be combined. A posterior feature vector may comprise the posterior probabilities of one or more phonemes or phoneme classes. For training, the artificial neural network merger may use the common phoneme label.

When the stop training criteria are fulfilled, each artificial neural network may be re-trained using phoneme labels from force alignment, i.e. phoneme labels specified by a user for a respective input feature vector. For re-training, the above described steps of the method may be repeated, wherein the common phoneme label may be determined based on phoneme labels from force alignment.

The invention further provides a method for automated phoneme recognition, wherein a plurality of artificial neural networks is provided and the artificial neural networks are trained using one of the above-described methods. First, a sequence of frames from a speech signal is received. A different subsequence of the received sequence is assigned to each of the artificial neural networks. Each subsequence comprises a predetermined number of frames. The outputs of the artificial neural networks are combined for estimating posterior probabilities of phonemes, phoneme classes and/or phoneme state.

A combination of the artificial neural networks may yield a global classifier, which yields, when used for automatic phoneme recognition, a higher phoneme recognition accuracy than a single artificial neural network which involves the same number of frames.

In particular, each of the artificial neural networks may be specialized in a particular part of the sequence or temporal context.

The outputs of the artificial neural networks may be combined using a merger, in particular, an average of log posteriors, AVGlog, a weighted average of log posteriors, WAV-Glog, or an artificial neural network. In this way, a global classifier may be obtained for estimating the posterior probability that a certain input, in particular a certain input feature vector, corresponds to a certain phoneme, phoneme state and/or phoneme class. In particular, the output of each of the plurality of artificial neural networks may be combined with the output of all other artificial neural networks.

The merger may correspond to an artificial neural network merger, in particular, a Multilayered Perceptron (MLP) merger. The output of the MLP merger may correspond to posterior probabilities. The artificial neural network merger may be trained using the common phoneme label.

The weights for a WAV-Glog merger may be chosen in order to stress the central information of the whole window or the whole sequence of frames. In other words, a higher weight may be given to the output of the one or more artificial neural networks to which the central part or subsequence of the received sequence was assigned. If the number of artificial neural networks is odd, there may be only one artificial neural network to which the central subsequence is assigned.

The output of the artificial neural networks, in particular the result or output of the merger, may be used as input for a Hidden Markov Model.

The invention further provides a computer program product, comprising one or more computer-readable media having computer executable instructions for performing the steps of one of the above-described methods when run on a computer.

The invention further provides an apparatus for training a plurality of artificial neural networks for phoneme recognition and/or for automated phoneme recognition, comprising a training processor and/or phoneme recognition processor configured to perform one of the above-described methods.

Furthermore, the invention provides a system for automatic speech recognition comprising. The system includes a plurality of artificial neural networks for phoneme recognition. Additionally, the system includes training data, wherein the training data comprises speech signals subdivided into frames, wherein each frame is associated with a phoneme label, wherein the phoneme label indicates a phoneme associated with the frame. Finally, the system includes a training module for training the predetermined number of artificial neural networks and/or for automated phoneme recognition.

The system for automatic speech recognition may be used in a vehicle, in particular, for speech control systems. The invention further provides a hands-free system comprising a system as described above.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Figure 1:
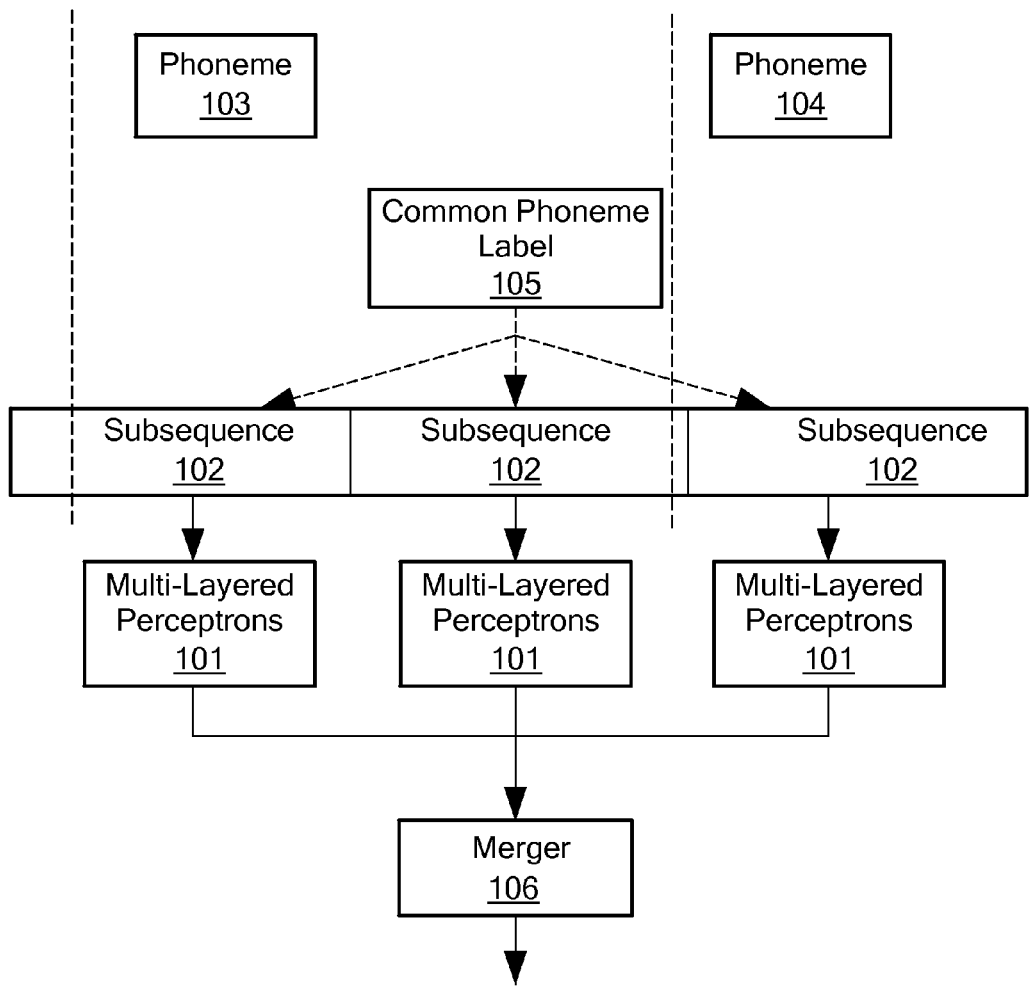
FIG. 1 shows a system comprising three artificial neural networks.

FIG. 1 shows a system comprising three artificial neural networks, in particular, Multilayered Perceptrons 101. The multilayered perceptrons may be embodied within one or more networked processors and may include both software and hardware. For example, each perceptron may be a separate ASIC chip that is networked together. The ASIC chip may be controlled by software code for implementing the functionality of the perceptron. As input for each Multilayered Perceptron 101 serves a feature vector comprising Mel Frequency Cepstral Coefficients determined from the frames of the respective subsequence 102. The feature vectors are determined based on frames of a subsequence of frames, wherein a subsequence of frames is assigned to each Multilayered Perceptron 101. A subsequence of frames may correspond to a part of a sequence of frames from the training data. The sequence of frames may comprise one or more phonemes. In this case, the provided sequence of frames comprises phonemes 103 and 104. The three Multilayered Perceptrons 101 are trained using a common phoneme label 105. The outputs of the Multilayered Perceptrons 101 are combined using a merger 106.

A plurality of classifiers or artificial neural networks may be trained, each artificial neural network corresponding to a different subsequence, slide or part of a provided sequence of frames or signal segment. In the example shown in FIG. 1, three artificial neural networks are trained using the same common phoneme label 105, which is based on or corresponds to the central frame of the central subsequence assigned to the central artificial neural network.

The window length of each Multilayered Perceptron 101 comprises 9 frames. In this way, the global context, signal segment or sequence of frames involves 27 frames, which corresponds to approximately 270 ms when using an exemplary time shift of 10 ms between two consecutive frames. Each Multilayered Perceptron 101 is based on a reduced slide or part of the global context. This fact implies a decrease in the required amount of training data. By combining the outputs of the artificial neural networks by a merger 106, a global classifier may be obtained.

The phonemes 103 and 104 may be taken from the training data. For example, the TIMIT corpus (L. F. Lamel et al., "Speech database development: Design and analysis of the acoustic-phonetic corpus", in Proc. DARPA Speech Recogn. Workshop, 1986, pp. 100-109) without the SA dialect sentences may be used as training data. The whole TIMIT database is divided into three parts. A training data set comprises 3346 utterances spoken by 419 speakers, a cross-validation data set comprises 350 utterances spoken by 44 speakers and a standard test data set comprises 1344 utterances spoken by 168 speakers.

The phoneme set or set of phoneme classes may correspond to the phoneme set comprising 39 phonemes or phoneme classes as given in Lee and Hon (1989) (K. F. Lee and H. W. Hon, "Speaker-independent phone recognition using hidden Markov models", in Proc. IEEE Trans. ASSP, 1989, vol. 37, pp. 1641-1648) with the difference that closures may be merged to the regarding burst as performed in "Recognition of phoneme strings using trap technique", by P. Schwarz et al., in EUROSPEECH, 2003, pp. 825-828.

Feature vectors of dimensionality 39 may be calculated, comprising 13 Mel Frequency Cepstral Coefficients, including log-energy, delta and double delta coefficients. The feature vectors may be under global mean and variance normalization. Each feature vector may be extracted from a frame or a window of 25 ms of speech with a shift of 10 ms.

The Multilayered Perceptrons 101 may be trained, for example, with the Quicknet software tool ("The SPRACHcore software packages", www.icsi.berkeley.edu/dpwe/projects/sprach). For each Multilayered Perceptron 101, 3-layer Perceptrons with 1000 hidden units are implemented. The number of output units may correspond to 39 or 117 for one-state and three-state model, respectively, with the softmax nonlinearity function at the output. A back-propagation algorithm with cross-entropy error criteria may be used for training the artificial neural network. The learning rate reduction and stop training criteria may be controlled by the frame error rate in cross-validation. In this way over-training can be avoided. The phoneme insertion penalty may be set to the one giving maximum phoneme accuracy in the cross-validation.

TIMIT hand labels may be utilized for the initial training of the artificial neural networks. The Multilayered Perceptrons 101 may then be re-trained employing labels from force alignment. If phoneme states are used, the phoneme hand labels may be uniformly distributed into states. Thereafter, the iterative process, in particular the automated training of the artificial neural networks, may be started.

The output of the merger 106 may be used as input for a Hidden Markov Model. A Viterbi decoder may be implemented. It may be assumed that all phonemes and/or phoneme states are equally distributed. A language model may be utilized. The silence may be discarded for evaluation.

The phoneme accuracy or phoneme recognition accuracy may be used as a measure of performance.

A merger 106 may be utilized to combine the output of the Multilayered Perceptrons 101. For example, one of three different kinds of mergers may be used: an average of log posteriors (AVGlog), a weighted average of log posteriors (WAV-Glog) (N. Morgan et al., "TRAPping conversational speech: Extending TRAP/Tandem approaches to conversational telephone speech recognition", in Proc. ICASSP, 2004, vol. 1, pp. 537-540) or a conventional Multilayered Perceptron (non-linear classifier). For the first two mergers, the final log posterior probability of a particular phoneme or phoneme class, $q_j$, given the spectral feature x, in particular an input feature vector, is defined as:

$$\log(P(q_j | x)) = \sum_{i=1}^{L} [w_i \log(P_i(q_j | x))],$$

where L is the number of classifiers or Multilayered Perceptrons and $w_i$ is the weight given to a particular classifier or artificial neural network. For the simple case of average log posteriors, each weight $w_i$ may take a value of 1/L. In this case, there may be a possibly inadequate assumption that each classifier is equally important (N. Morgan et al., "TRAPping conversational speech: Extending TRAP/Tandem approaches to conversational telephone speech recognition", in Proc. ICASSP, 2004, vol. 1, pp. 537-540). For WAV-Glog, weights may be chosen to stress certain information such as the one found in the central classifier or artificial neural network.

The input of a Multilayered Perceptron merger may consist of a concatenation or combination of the posterior feature vectors from the Multilayered Perceptrons 101 to be combined. For training, the MLP merger may use the phoneme label of the central frame of the central classifier or Multilayered Perceptron 101.

The predetermined number of frames of each slide, part or subsequence of a signal segment or sequence of frames may be determined based on an optimum context length when using only one artificial neural network for phoneme recognition. The optimum context length may be determined based on an evaluation of traditional systems, i.e. systems comprising only one artificial neural network for automated phoneme recognition.

Context information plays an important role for improving performance of systems for phoneme recognition. Due to co-articulation effects, a particular phoneme may behave differently if the phoneme is found isolated or if the phoneme is embedded in a sequence with other phonemes. In order to consider all these variations, it may be necessary to take an appropriate context length, learn all these variations and finally, be able to classify a phoneme independently on the context.

The main characteristics of a phoneme may be better estimated if the context window or the sequence of frames covers more than 100 ms of speech, rather than only 25 ms which is the typical time window for short term feature vectors. Increasing the context may be performed by concatenating several feature vectors, resulting in a multi feature vector. Thus, the multi feature vector may be given at the input of the Multilayered Perceptron phoneme classifier. Table 1 shows results when different numbers of feature vectors are concatenated, forming a window of different frame lengths. In this case, only a single Multilayered Perceptron is used for phoneme recognition. The table shows results, i.e. phoneme recognition accuracies (in %), for a system considering three phoneme states (3-state) and one phoneme state (1-state), i.e. individual phonemes.

TABLE 1

Varying frame window size at the input of a single MLP classifier.

| Frames | 1-state | 3-state |
|--------|---------|---------|
| 1 | 61.76 | 65.45 |
| 3 | 66.01 | 69.46 |
| 5 | 66.91 | 70.33 |
| 7 | 66.54 | 70.44 |
| 9 | 67.37 | 70.64 |
| 13 | 67.02 | 70.92 |
| 15 | 67.60 | 71.03 |
| 21 | 67.29 | 70.76 |
| 25 | 66.83 | 70.26 |
| 29 | 65.82 | 69.31 |

It can be seen from Table 1 that the performance increases when the window is augmented from 1 to 9 frames. The performance continues to increase steadily with an asymptotic behaviour until a window length of 15 frames is achieved. Afterwards, the performance significantly drops off when the window length is excessively augmented, approaching 300 ms.

The problem of reduction in performance when the context is significantly enlarged may be attributed to the lack of training data. When the context is extended, an increased amount of information is given to the artificial neural network, which can require more training data for robustly estimating its parameters.

It can be observed that the approach of increasing the number of frames of the window has an optimal point where the performance is maximized. If the number of frames is moved away from this optimal point, i.e. by decreasing or increasing frames, the performance can drop off.

Figure 4:
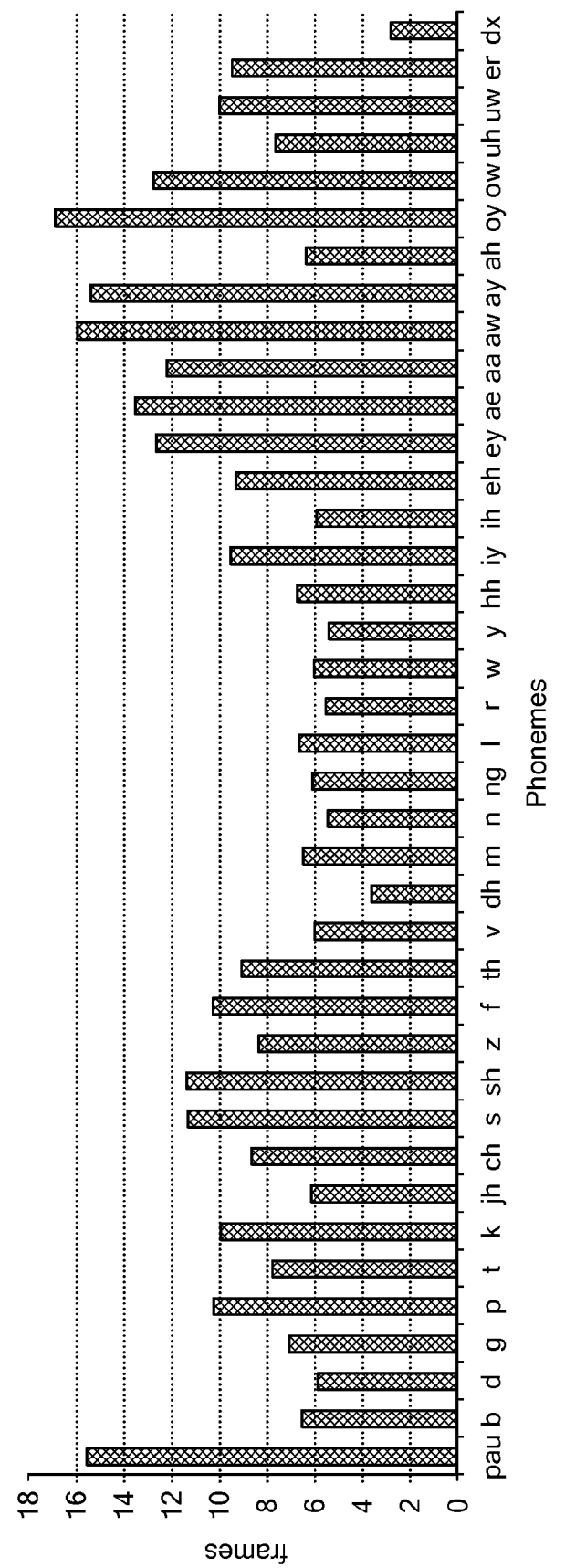
FIG. 4 shows an average length in frames per phoneme.

To estimate how much information can be contained in a window and how many phonemes it can comprise or involve, the average number of consecutive frames per phoneme may be calculated from the training data. As an example, in FIG. 4 the average length in frames per phoneme is shown for the TIMIT training data. It is shown that the phoneme /oy/ occupies on average the longest time interval, with an average number of 16.9 frames (approximately 170 ms). The shortest phonemes according to its average number of frames is /dx/ with 2.9 frames (approximately 30 ms). The average number of frames that any phoneme may occupy corresponds to 8.9 frames (approximately 90 ms).

The average number of frames is coherent with the results given in Table 1. Having 9 frames in a window or subsequence of frames, the context encloses, on average, only one phoneme. In this way, the use of reduced training data may be optimized. If the window is enlarged, information of other phonemes may start to appear in the context currently considered. How a particular phoneme is bound by other phonemes remarks co-articulation effects. This information may be useful for improving phoneme classification. In contrast, several combinations of phonemes must be observed during training, requiring more training data.

By using a plurality of artificial neural networks, wherein to each of the artificial neural networks a different part or subsequence of frames is assigned, temporal context may be expanded. In particular, each subsequence may comprise a predetermined number of frames, wherein the predetermined number of frames may be determined based on an optimum context length when using only one artificial neural network for phoneme recognition. In this way, each artificial neural network may model a different temporal context of each phoneme.

In particular, each of the Multilayered Perceptrons 101 shown in FIG. 1 may comprise 9 frames.

Figure 2:
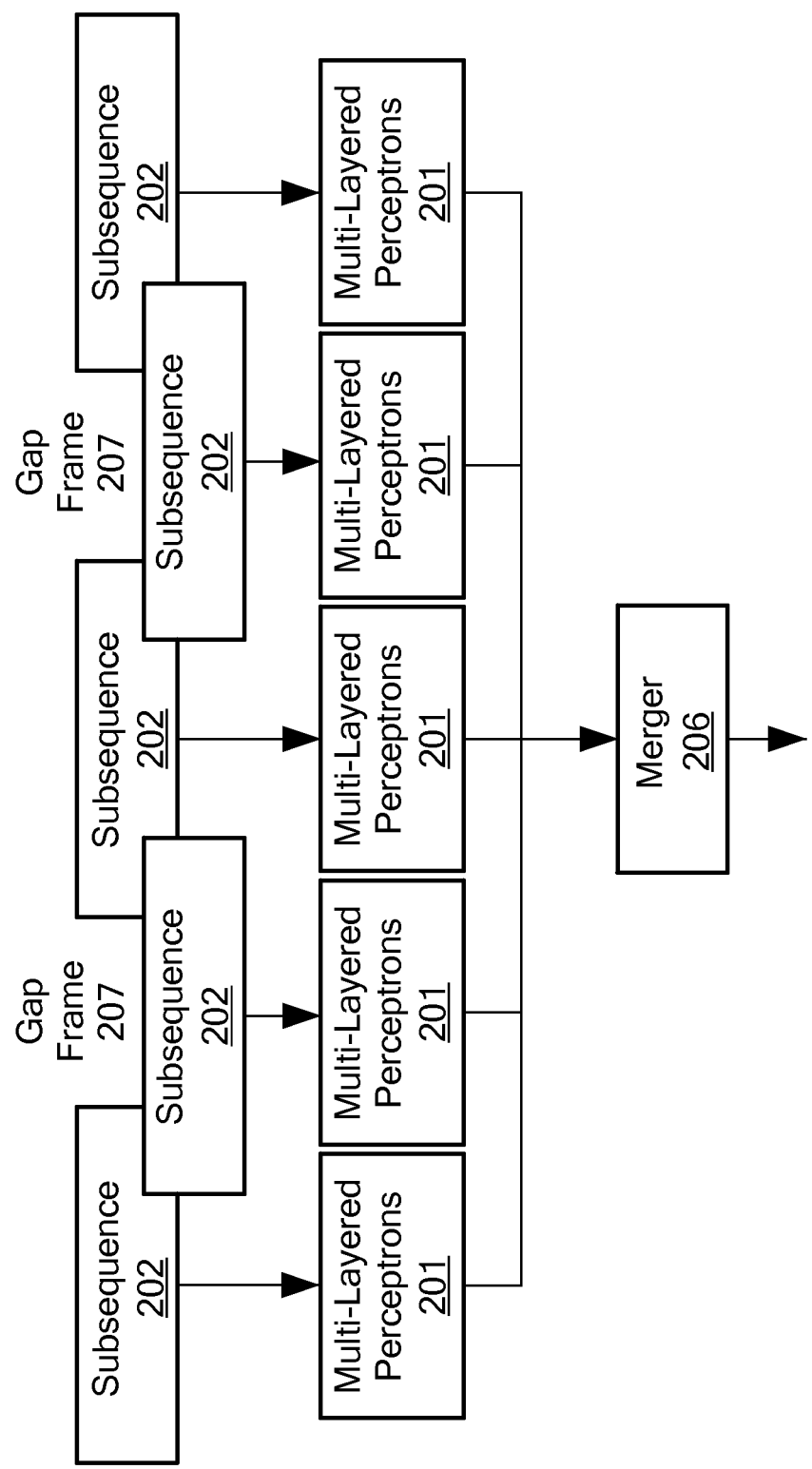
FIG. 2 shows a system comprising five artificial neural networks with partially overlapping subsequences.

In FIG. 2, another example is shown, comprising 5 Multilayered Perceptrons 201. In this example, each subsequence 202 assigned to a Multilayered Perceptron 201 or classifier of a first subset of Multilayered Perceptrons 201 is separated by one frame, a "gap frame" 207. Each of these gap frames 207 has been selected as a central frame for a Multilayered Perceptron 201 of a second subset. Each Multilayered Perceptron 201 of the second subset overlaps half of its window or subsequence 202 to the classifier or Multilayered Perceptron 201 from the first subset situated at its left and half of the window or subsequence 202 to the one situated at its right. By introducing these overlapping subsequences 202, the transitions that appear between the subsequences 202 of the first subset may be modelled. A global context of 29 frames is employed for the example as shown in FIG. 2.

Figure 3:
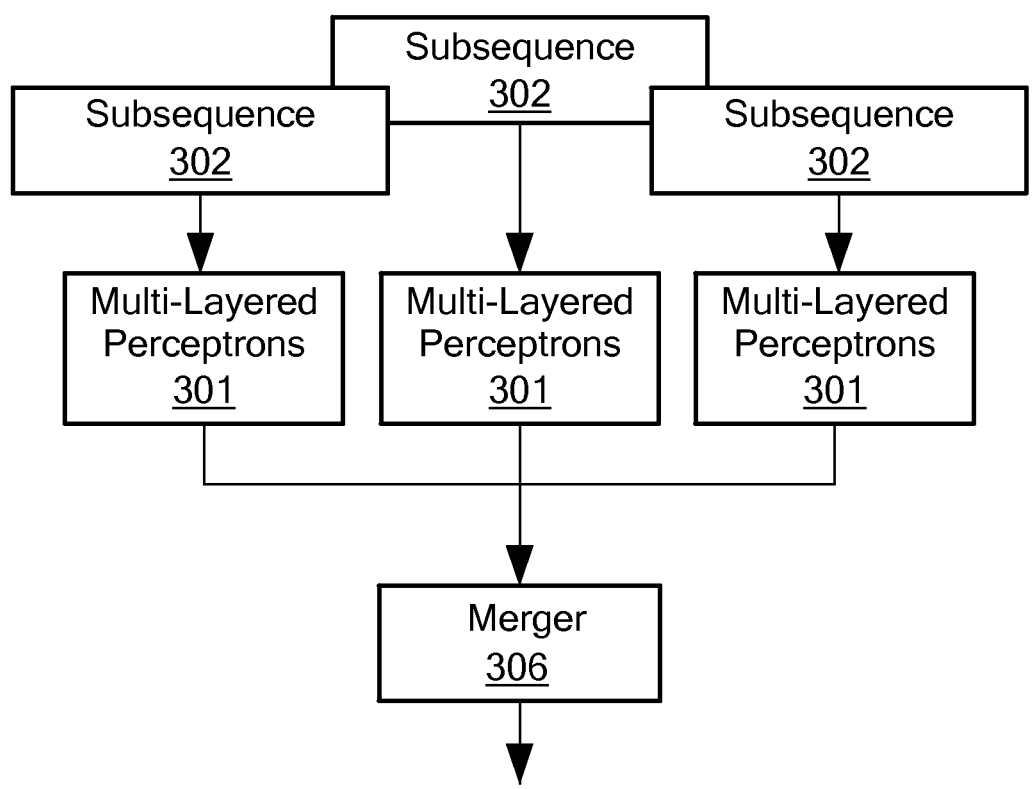
FIG. 3 shows a system comprising three artificial neural networks and a gap frame.

In FIG. 3, an example comprising 3 Multilayered Perceptrons 301 is shown. The outputs of the Multilayered Perceptrons 301 are combined by a merger 306. This example is similar to the one shown in FIG. 2 but without the leftmost and rightmost Multilayered Perceptron. A total of 19 frames are considered in the example as shown in FIG. 3.

Table 2 shows the results for phoneme recognition accuracies (in %) when using 1-state or 3-state models and the examples as shown in FIG. 1, 2 or 3.

TABLE 2

Phoneme recognition accuracies employing temporal decomposition.

| System | Total frames | merger | 1-state | 3-state |
|---|---|---|---|---|
| Single classifier | 9 | | 67.37 | 70.64 |
| Setup FIG. 1 | 27 | MLP | 69.37 | 72.39 |
| | | AVGlog | 68.29 | 71.42 |
| | | WAVGlog | 68.88 | 71.63 |
| Setup FIG. 2 | 29 | MLP | 70.10 | 72.89 |
| | | AVGlog | 69.04 | 71.90 |
| | | WAVGlog | 69.12 | 71.92 |
| Setup FIG. 3 | 19 | MLP | 69.20 | 71.78 |
| | | AVGlog | 68.46 | 71.76 |
| | | WAVGlog | 69.10 | 71.69 |

In Table 2, the weights for the WAV-Glog merger were chosen in order to stress the central information of the whole window or sequence of frames, i.e. a higher weight was given to the Multilayered Perceptron situated in the middle. All weights may be selected to sum to 1 and they are symmetric with respect to the central classifier or artificial neural network. This form of selecting the weights may be seen as a filtering process which emphasizes the assumed most important information, which was assumed to be in the middle of the global context.

As it can be seen in Table 2, the weighted average works better in almost all cases, compared to the average combiner. Besides, it can be observed that the MLP merger performs the best among all mergers evaluated. In particular, the MLP merger can learn in a non-linear fashion how to combine the outputs of the different artificial neural networks, which are specially trained to better recognize particular slides of the global context.

Comparing Setup FIG. 1 and Setup FIG. 2, it can be observed that by introducing one artificial neural network in the intersection of two artificial neural networks, overlapping both of them, i.e. using overlapping subsequences, a better transition between subsequences can be modelled. Hence, helpful information can be extracted, giving additional improvement in performance.

In Table 2, an absolute improvement of 2.73% (1-state) and 2.25% (3-state) is obtained over a single artificial neural network with 9 frames. In addition, comparing Setup FIG. 2 with a single artificial neural network with a 29 frames window, given in Table 1, an absolute improvement of 4.28% (1-state) and 3.58% (3-state) is obtained.

The phoneme recognition accuracy may be enhanced with a bigram language model. For Setup FIG. 2 with 3 phoneme states, i.e. 3-states, it increases from 72.89% to 73.42%. This approach out-performs a single classifier with the same context length with an absolute improvement of 3.6%.

Although the previously discussed embodiments of the present invention have been described separately, it is to be understood that some or all of the above described features can also be combined in different ways. The discussed embodiments are not intended as limitations but serve as examples illustrating features and advantages of the invention. The embodiments of the invention described above are intended to be merely exemplary; numerous variations and modifications will be apparent to those skilled in the art. All such variations and modifications are intended to be within the scope of the present invention as defined in any appended claims.

It should be recognized by one of ordinary skill in the art that the foregoing methodology may be performed in a signal processing system and that the signal processing system may include one or more processors for processing computer code representative of the foregoing described methodology. The computer code may be embodied on a tangible computer readable medium i.e. a computer program product.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof. In an embodiment of the present invention, predominantly all of the reordering logic may be implemented as a set of computer program instructions that is converted into a computer executable form, stored as such in a computer readable medium, and executed by a microprocessor within the array under the control of an operating system.

Computer program logic implementing all or part of the functionality previously described herein may be embodied in various forms, including, but in no way limited to, a source code form, a computer executable form, and various intermediate forms (e.g., forms generated by an assembler, compiler, networker, or locator.) Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies, networking technologies, and internetworking technologies. The computer program may be distributed in any form as a removable storage medium with accompanying printed or electronic documentation (e.g., shrink wrapped software or a magnetic tape), preloaded with a computer system (e.g., on system ROM or fixed disk), or distributed from a server or electronic bulletin board over the communication system (e.g., the Internet or World Wide Web.)

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL.).

What is claimed is:

1. A computer implemented method, operational on at least one processor, for automated training of a plurality of artificial neural networks for phoneme recognition using training data, wherein the training data comprises speech signals subdivided into frames, each frame associated with a phoneme label, wherein the phoneme label indicates a phoneme associated with the frame, the method comprising:
   a computer process for providing a sequence of frames from the training data, wherein the number of frames in the sequence of frames is at least equal to the number of artificial neural networks;
   a computer process for assigning to each of the artificial neural networks a different subsequence of the provided sequence, wherein each subsequence comprises a predetermined number of frames;
   a computer process for determining a common phoneme label for the sequence of frames based on the phoneme labels of one or more frames of one or more subsequences of the provided sequence; and
   a computer process for training each artificial neural network using the common phoneme label.

2. The computer implemented method according to claim 1, wherein one or more frames of the provided sequence of frames are part of more than one subsequence assigned to an artificial neural network.

3. The computer implemented method according to claim 1, wherein the common phoneme label is based on one or more phoneme labels of the frames from one or more central subsequences or artificial neural networks.

4. The computer implemented method according to claim 1, wherein the predetermined number of frames is the same for each subsequence of frames.

5. The computer implemented method according to claim 1, wherein the frames of the provided sequence of frames are subsequent or adjacent in time and/or wherein the subsequences of the provided sequence are subsequent or adjacent in time.

6. The computer implemented method according to according to claim 1, wherein the plurality of artificial neural networks comprises two subsets, wherein a subsequence assigned to an artificial neural network of a second subset comprises at least one frame which is also part of a subsequence assigned to an artificial neural networks of a first subset.

7. The computer implemented method according to according to claim 1, wherein the subsequences are separated from each other in time, in particular, separated by one or more frames comprised in the provided sequence of frames.

8. The computer implemented method according to claim 7, wherein the plurality of artificial neural networks comprises two subsets, wherein subsequences assigned to artificial neural networks of a first subset are separated from each other in time, and wherein each of the subsequences assigned to artificial neural networks of a second subset comprises at least one frame separating two subsequences assigned to artificial neural networks of the first subset.

9. The computer implemented method according to claim 1, wherein the predetermined number of frames corresponds to the number of frames, which yields, when using only one artificial neural network for phoneme recognition, a predetermined phoneme recognition accuracy, in particular according to a predetermined criterion.

10. The computer implemented method according to claim 9, wherein the predetermined phoneme recognition accuracy corresponds to the maximum phoneme recognition accuracy as a function of the number of frames.

11. The computer implemented method according to claim 1, wherein the predetermined number of frames corresponds to the average phoneme length in the training data, wherein the average is calculated using all phonemes of the training data.

12. The computer implemented method according to claim 1, wherein for each frame of each subsequence of frames a feature vector is provided, in particular comprising a predetermined number of Mel Frequency Cepstral Coefficients.

13. The computer implemented method according to claim 1, further comprising:
- a computer process for receiving a sequence of frames from a speech signal;
- a computer process for assigning to each of the artificial neural networks a different subsequence of the received sequence, wherein each subsequence comprises a predetermined number of frames; and
- a computer process for combining the output of the artificial neural networks for estimating posterior probabilities of phonemes, phoneme classes and/or phoneme states.

14. A computer program product including a "non-transitory" computer readable storage medium having computer executable code thereon for automated training of a plurality of artificial neural networks for phoneme recognition using training data, wherein the training data comprises speech signals subdivided into frames, each frame associated with a phoneme label, wherein the phoneme label indicates a phoneme associated with the frame, the computer code comprising:
- computer code for providing a sequence of frames from the training data, wherein the number of frames in the sequence of frames is at least equal to the number of artificial neural networks;
- computer code for assigning to each of the artificial neural networks a different subsequence of the provided sequence, wherein each subsequence comprises a predetermined number of frames;
- computer code for determining a common phoneme label for the sequence of frames based on the phoneme labels of one or more frames of one or more subsequences of the provided sequence; and
- computer code for training each artificial neural network using the common phoneme label.

15. The computer program product according to claim 14, wherein one or more frames of the provided sequence of frames are part of more than one subsequence assigned to an artificial neural network.

16. The computer program product according to claim 14, wherein the common phoneme label is based on one or more phoneme labels of the frames from one or more central subsequences or artificial neural networks, in particular, on a central frame of a central subsequence.

17. The computer program product according to claim 14, wherein the predetermined number of frames is the same for each subsequence of frames.

18. The computer program product according to claim 14, wherein the frames of the provided sequence of frames are subsequent or adjacent in time and/or wherein the subsequences of the provided sequence are subsequent or adjacent in time.

19. The computer program product according to claim 14, wherein the plurality of artificial neural networks comprises two subsets, wherein a subsequence assigned to an artificial neural networks of a second subset comprises at least one frame which is also part of a subsequence assigned to an artificial neural networks of a first subset.

20. The computer program product according to claim 14, wherein the subsequences are separated from each other in time, in particular, separated by one or more frames comprised in the provided sequence of frames.

21. The computer program product according to claim 20, wherein the plurality of artificial neural networks comprises two subsets, wherein subsequences assigned to artificial neural networks of a first subset are separated from each other in time, and wherein each of the subsequences assigned to artificial neural networks of a second subset comprises at least one frame separating two subsequences assigned to artificial neural networks of the first subset.

22. The computer program product according to claim 14, wherein the predetermined number of frames corresponds to the number of frames, which yields, when using only one artificial neural network for phoneme recognition, a predetermined phoneme recognition accuracy, in particular according to a predetermined criterion.

23. The computer program product according to claim 22, wherein the predetermined phoneme recognition accuracy corresponds to the maximum phoneme recognition accuracy as a function of the number of frames.

24. The computer program product according to claim 14, wherein the predetermined number of frames corresponds to the average phoneme length in the training data, wherein the average is calculated using all phonemes of the training data.

25. The computer program product according to claim 14, wherein for each frame of each subsequence of frames a feature vector is provided, in particular comprising a predetermined number of Mel Frequency Cepstral Coefficients.

26. A computer program product according to claim 14, further comprising:
- computer code for receiving a sequence of frames from a speech signal;
- computer code for assigning to each of the artificial neural networks a different subsequence of the received sequence, wherein each subsequence comprises a predetermined number of frames; and
- computer code for combining the output of the artificial neural networks for estimating posterior probabilities of phonemes, phoneme classes and/or phoneme states.

* * * * *